Nov. 10, 1970 J. P. MAHONY 3,539,997

SYNCHRONIZING CIRCUIT

Filed Dec. 5, 1962

INVENTOR
J. P. MAHONY
BY Howard R Popper
ATTORNEY

United States Patent Office 3,539,997
Patented Nov. 10, 1970

3,539,997
SYNCHRONIZING CIRCUIT

John P. Mahony, Weehawken, N.J., assignor to Bell Telephone Laboratories, Incorporated, New York, N.Y., a corporation of New York
Filed Dec. 5, 1962, Ser. No. 243,203
Int. Cl. G06f 7/02
U.S. Cl. 340—172.5 16 Claims This invention relates to data communication systems and, more particularly, to synchronizing circuits.

Synchronizing circuits are extensively employed in data systems. If a series of data bits is sent from a transmitter to a receiver the receiver equipment must be synchronized to the transmitter. That is to say, the receiver must "know" which bits comprise a complete word. Often a continuous stream of data bits is received, and for the data to be intelligible the receiver must "know" which successive groups of bits comprise complete data words. The receiver is "synchronized" when it can thus separate the received bits into meaningful groups.

Numerous factors may cause the receiver to fall out of synchronism with the transmitting equipment with which it is operated. For example, the receiver is often out of synchronism at the beginning of the data transmission. Even after synchronization is achieved the receiver may fall out of synchronism. For example, external causes may cause a transmitted bit to be obliterated and the receiver, unaware of this, falls out of synchronism by one bit time.

For this reason many data communication systems have "framing" bits, or similarly designated information, inserted in the transmitted data. For example, the first bit in each data word may always be in binary 1, this framing bit position being the only one in each word which may never contain a binary 0. When the receiver is prepared to receive the first bit in a new word it checks the value of this bit, and if it is a binary 1 determines itself to still be in synchronism. When a binary 0 is detected in this position the receiver determines itself to be out of synchronism. Numerous other framing schemes may be employed. For example, framing bits may alternate in binary value, and the receiver may determine a loss of synchronism when successive framing bits, or more accurately, what the receiver "thinks" to be successive framing bits, have the same value. Similarly, more than one framing bit may be inserted in each transmitted word, or conversely only one framing bit may be inserted in each group of words.

When a loss of synchronism is detected a synchronizing circuit is employed by the receiver to regain synchronism. The prior art includes synchronizing circuits employing various techniques for regaining synchronism. A popular technique, for example, is that in which the synchronizing circuit arbitrarily "assumes" a particular bit position to contain a framing bit. If the succeeding assumed framing positions contains bits of the proper values the synchronizing circuit may determine synchronization to have been achieved after a particular number of these positions in succession have contained the correct framing information. If the particular position first selected is determined not to be a framing position because a succeeding assumed framing position contains a bit of the wrong value, another position is assumed to be a framing position and succeeding assumed framing positions are examined. This process continues until the synchronizing circuit determines the correct framing position.

This technique as well as others in the prior art are not as reliable as they need be in many applications. The data transmitted is often random in nature, and it is possible for the same bit position in successive words to contain data bits whose values are those of the framing bit sequence. In such an event the synchronizing circuit may determine that synchronization exists when, in fact, it has not been achieved.

Another short-coming of prior art synchronizing circuits is that they require, on the average, a considerable length of time to determine the framing positions. During this time the data received is unintelligible, and in some systems is disregarded. Although this may be permissible for short intervals, many systems may not permit an interruption in the receiver operation for as long a time as is required for the synchronization process. In other systems where no loss of data is permissible, the data transmitted during the synchronization process must be either stored and operated upon after synchronization is achieved, or alternatively, be retransmitted once the receiver is resynchronized. In either event effective communication is interrupted for the time required for the synchronization process, and if this time is excessive the synchronizing circuit may be inadequate for the particular application.

It is a general object of this invention to provide improved synchronizing circuits and improved synchronization techniques.

It is another object of this invention to provide more reliable synchronizing circuits and synchronization techniques than have heretofore been employed in the prior art.

It is still another object of this invention to provide synchronizing circuits and synchronization techniques requiring less time to achieve synchronization than has been possible in the prior art.

The prior art techniques are generally based on the examination of assumed framing bit positions in successive words to determine if these positions contain values consistent with the framing sequence. The technique employed in the invention, however, examines all bit positions to determine which positions are not framing positions. For example, if a transmitted word contains 24 bits, one of which is a framing bit, successive groups of 24 bits each are examined, and the synchronizing circuit determines which 23 bit positions in each group are not framing positions as a result of the appearance of successive bits in the same positions in each group of bits containing binary values inconsistent with the framing sequence. In this manner it is determined that the remaining position, the only one for which successive bits have appeared in the correct framing sequence, is the framing bit position.

It is apparent that it is possible to achieve 100 percent reliability with this technique. It can be definitely established that 23 of the 24 bit positions are not framing positions and thus, the remaining position must be the framing position. Rather than the random nature of the data bits erroneously identifying a data bit position as being the framing bit position as in many prior art techniques, the random nature of the bits is advantageously utilized to establish which positions contain data bits, the remaining position or positions necessarily containing the framing bits.

The technique is generally applicable to many different types of systems employing various framing schemes. In one illustrative embodiment of the invention each transmitted word contains one framing bit of constant binary value. The synchronizing circuit determines when all but one position in a succession of groups of bits, each being a word length, have contained bits of the other binary value. The remaining position must therefore be that one containing the framing bit, this position being the only one having contained successive bits of the same predetermined value.

In a second illustrative embodiment of the invention each word contains two framing bits of opposite binary values. Each word of 24 bits comprises 22 bits of data and two framing bits, the 1st and the 13th. By examining successive groups of 12 bits to see which 11 of the bit positions contain the same binary value at least twice in succession it is determined that each one of these positions cannot possibly be a framing position. The remaining positions, the only one which has contained alternate value binary digits, is necessarily a framing position.

It is a feature of this invention to advantageously utilize and directly employ the random nature of data bits to determine synchronization rather than to permit the random bits to erroneously indicate synchronization.

It is another feature of this invention to establish with maximum certainty which bit positions in successive groups of bits are data positions.

It is another feature of this invention to determine which bit positions in successive groups contain bits having values consistent with the framing sequence.

It is another feature of this invention to determine which bit positions in successive groups contain bits having values inconsistent with the framing sequence.

It is still another feature of this invention to examine the relative positions of the bit positions determined to have contained bits having values consistent or inconsistent with the framing sequence.

Further objects, features and advantages will become apparent upon consideration of the following detailed description in conjunction with the drawing, in which.

Figure 1:
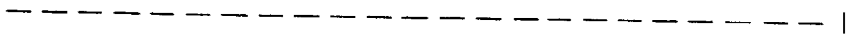
FIG. 1 shows the form of a typical data word.

Referring to FIG. 1, a 24-bit word is shown, the word comprising 23 data bits and one framing bit. The framing bit is always the first bit in any word, and is always a binary 1. The 23 data bits following the framing bit have binary values in accordance with the information data being transmitted.

Figure 2:
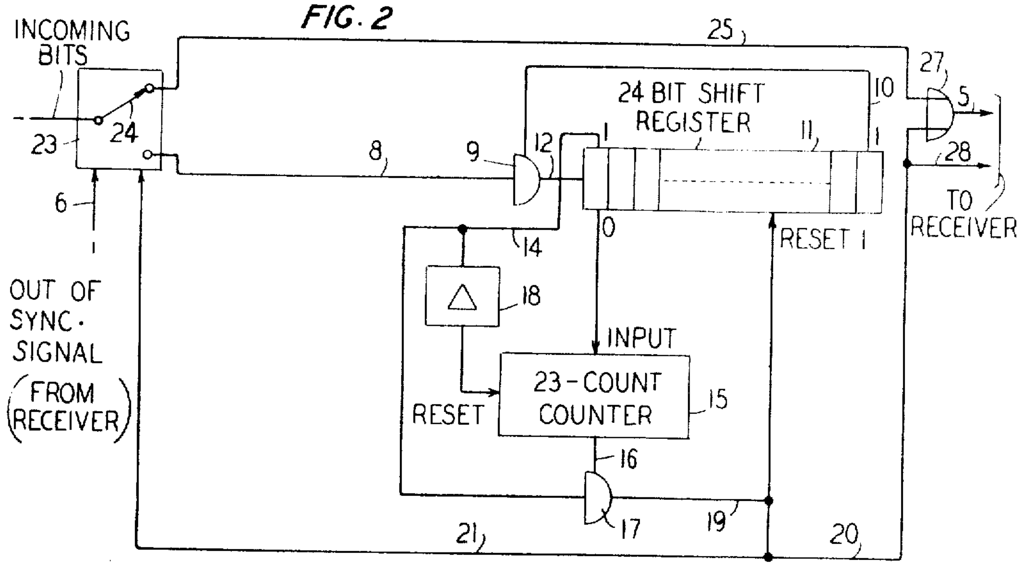
FIG. 2 is a schematic of a first illustrative embodiment of the invention for use with the data word of FIG. 1.

FIG. 2 is a schematic of a synchronizing circuit that may be advantageously employed with a receiver circuit of a data communication system in which a transmitted word has the pattern of FIG. 1 to determine the framing bit position in the event synchronization is lost. When in synchronism, the incoming bits enter switching circuit 23 and are applied by switch 24 therein to conductor 25. All incoming bits are transmitted along this conductor and through OR gate 27 to conductor 5. Conductor 5 is extended to the receiver equipment which operates upon the incoming bits. The receiver equipment may contain circuitry for checking the appearance of the framing bit at the beginning of each word. As long as the framing bit is of the proper polarity the receiver is considered to be "in synchronism." When the receiver does not detect the correct polarity framing bit in what it considers to be the framing position, an "out of synchronism" signal is obtained. This signal notifies the receiver equipment that synchronism has been lost. The signal is also applied to conductor 6 to bring into action the synchronizing circuit of FIG. 2. Any one of many framing bit checking circuits may be employed in the receiver equipment to determine the loss of synchronism. The present invention is generally applicable with all of these circuits, and for this reason a particular checking circuit is not disclosed. The signal on conductor 6 may advantageously be derived from any well known checking circuits.

The signal on conductor 6 causes switch 24 to connect the input conductor along which the incoming bits are received to conductor 8 at the input of gate 9. The incoming bits are no longer transmitted to the receiver (although in a particular application they may still be applied to the receiver input, if desired), and the bits are now acted upon by the synchronizing circuit instead. The function of the synchronizing circuit is to operate upon the incoming bits and determine which position contains the framing bit, always a binary 1. When the synchronizing circuit determines that the last bit received, a binary 1, is the framing bit, the signal representing a 1 is applied to conductor 19 by gate 17. This bit is transmitted along conductor 20 to OR gate 27. The resulting bit on conductor 5 is transmitted to the receiver equipment. The same bit appears on conductor 28, and notifies the receiver that the bit received on conductor 5 is the first bit, the framing bit, in a new word. At the same time the pulse on conductor 19 is extended along conductor 21 to switching circuit 23, and causes switch 24 to once again allow the incoming bits to be transmitted to conductor 25. The first bit in the incoming word is not transmitted along conductor 25 as this bit was received when switch 24 was still connected to the input of gate 9. However the signal on conductor 20 is applied through OR gate 27 to conductor 5, and is equivalent to the framing bit. The next incoming bit, the second in the word, or the first data bit, as well as all succeeding bits are transmitted along conductor 25, and through OR gate 27 to the receiver equipment. Thus, when the framing bit is detected, all the bits in the incoming word are applied to conductor 5. At the same time the binary 1 on conductor 28 causes the receiver to operate upon the incoming word, and the binary 1 on conductor 21 restores the switching circuit 23 to its normal position, as shown.

When the out of synchronism signal is applied to conductor 6 it is not known which position in a complete word the incoming bit represents. The first 24 bits, comprising the latter part of one word and the first part of the succeeding word, are successively applied to the input of gate 9. Initially all 24 stages of shift register 11 are reset in the binary 1 state, and thus, with a binary 1 appearing in the last stage of the shift register, conductor 10, which is conected to the binary 1 output of register 11, is energized. Conductor 10 connects the binary 1 output of this stage to the control terminal of gate 9, and gate 9 is thus enabled. Gate 9 causes a binary 1 signal to be applied to conductor 12 only if input conductor 8 has applied to it a binary 1 signal. If a 0 is applied gate 9 causes a 0 to be applied to conductor 12. If the last stage of shift register 11 contains a 0, conductor 10 is not energized and gate 9 is not enabled. In such an event, even if conductor 8 contains a binary 1, AND gate 9 causes a 0 to be applied to conductor 12.

The method of the invention is predicated upon the fact that as successive groups of 24 incoming bits are examined, eventually 23 bit positions will each have contained at least one 0. This is a result of the random nature of the data bits. Only the framing position will have contained a 1 in every group of 24 incoming bits examined, as the framing bit does not vary. A 0 stored in a stage of shift register 11 indicates that a respective position in each group of 24 bits examined is not the framing position. If a 0 appears on conductor 8, even if conductor 10 is energized, a 0 is stored in the first stage of the shift register. Once a 0 is stored in the register, indicating that the associated bit position is not a framing bit, a 1 may not thereafter be stored in the register even if the incoming bit in the same position in a succeeding group is a 1. For example, suppose that the first bit received is a binary 0. Although the last stage of shift register 11 is initially in the 1 state and thus conductor 10 is energized, the 0 on conductor 8 causes a 0 to be applied to conductor 12. A 0 is thus stored in the first stage of shift register 11. When the 25th incoming bit appears the 0 stored in the first stage of shift register 11 has been shifted to the last stage. At this time conductor 10 is not energized and even if the 25th bit is a binary 1, a 0 is still applied to conductor 12; a 0 is once again stored in the first stage of the shift register. It is seen that once a position in a group of 24 is determined not to be the framing position the associated position in shift register 11 always contains a 0.

Eventually 23 stages of shift register 11 will contain 0's. Although all 24 positions initially contained 1's, only one of these positions remains unchanged. This is due to the fact that each time the true framing bit appears a 1 is in the last stage of shift register 11, and thus a 1 is stored in the first stage of the register. When the next true framing bit appears the 1 previously stored in the first stage is in the last stage, and once again the incoming framing bit causes a 1 to be stored in the first stage of shift register 11. In this manner it is definitely established which position in the group of 24 being examined contains the framing bit.

The remainder of the synchronizing circuit causes a 1 to be applied to conductor 19 when the first incoming framing bit is received after shift register 11 contains 23 binary 0's. Counter 15 advances each time a 0 is stored in the first stage of shift register 11 but is reset each time a binary 1 is stored therein. After the counter has counted 23 successive binary 0's its output conductor 16 is energized. This causes gate 17 to be enabled. As shift register 11 contains twenty-three 0's and one 1, after twenty-three 0's have been counted in succession the next bit stored in the first stage of the shift register should be a 1. When this 1 is stored in the first stage of the register conductor 14 is energized. The 1 on conductor 14 is transmitted through gate 17 to conductor 19 and is an indication that the bit just received, and which caused the 1 to be stored in the first stage of shift register 11, is the framing bit. The 1 on conductor 19 is applied to conductors 5 and 28. The signal on conductor 28 notifies the receiver that the bit appearing on conductor 5 is the first bit, the framing bit, in a new word. The signal on conductor 19 also causes switch 24 to once again resume its normal position and succeeding incoming bits are applied directly to conductor 25, and through OR gate 27 to conductor 5. The signal on conductor 19 is also applied to the reset terminal of shift register 11. In the reset condition a 1 is stored in all 24 stages of the register, and thus the register is prepared for a new synchronizing operation in the event that another out of synchronism signal is applied to conductor 6.

Initially all twenty-four stages of shift register 11 are in the 1 state. Eventually only one of these stages will be in this state, the other twenty-three containing 0's. In the course of the synchonization process 0's are stored in the first stage of shift register 11, and each time a 0 is stored in this stage counter 15 advances. Counter 15 must count twenty-three 0's in succession, however, before gate 17 is enabled. If less than twenty-three 0's are counted before a 1 is stored in the first stage of shift register 11, counter 15 must reset. When a 1 is stored in the first stage of shift register 11 and conductor 14 is energized, the signal is transmitted through delay 18 to reset the counter. Delay 18 is included to allow the signal on conductor 14 to be transmitted through gate 17 before the energizing potential on conductor 16 is removed in the event counter 15 has counted twenty-three 0's in succession. In such an event the 1 on conductor 14 is transmitted to conductor 19 before it passes through delay 18 to reset the counter. If the counter has not counted twenty-three 0's when a 1 is applied to conductor 14 the signal does not pass through gate 17, and only passes through delay 18 to reset the counter. The counter resumes counting from an initial 0 count, and only after twenty-three 0's are counted in succession does the 1 stored in the first stage of shift register 11 pass through gate 17 to conductor 19.

Figure 3:
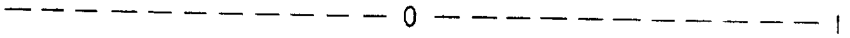
FIG. 3 shows the form of another typical data word.

Very often in pulse comunication systems more than one framing bit is inserted in each word transmitted. An example of such a word is shown in FIG. 3. As does the word of FIG. 1, the word of FIG. 3 contains 24 bits. However, only 22 are information data bits, rather than 23, and two are framing bits, rather than only one. This type of word is often employed for greater reliability. The 1st and 13th bits are framing bits, with the 1st bit always a 1, and the 13th always a 0. The 11 bits separating successive framing bits are the data bits.

Figure 4:
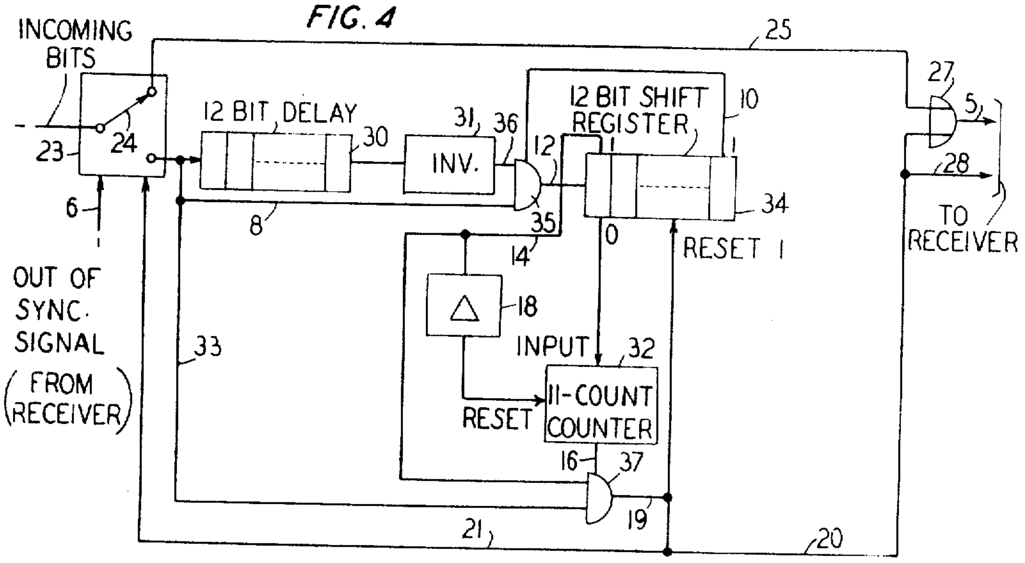
FIG. 4 is a schematic of a second illustrative embodiment of the invention for use with the data word of FIG. 3.

FIG. 4 is a schematic of a synchronizing circuit that may be advantageously employed in a communication system in which the incoming words are of the form shown in FIG. 3.

The synchronizing cricuit of FIG. 4 examines successive groups of 12 bits rather than 24. Respective positions in each group of 12 are compared with each other. The first and thirtienth positions are thus paired, as are the second and fourtenth, etc. The two positions which contain the framing bits should always alternate in binary value as seen from FIG. 3. Thus, for example, if two incoming bits separated by 12 positions both contain the same binary value, these positions may not posisbily be framing positions.

The synchronizing cricuit of FIG. 4 contains a 12 bit shift register 34. Each stage of this register is associated with one of the 12 positions in each group of incoming bits. A 0 in a stage of shift register 34 indicates that a respective position in two successive groups of 12 bits contained the same binary value, and thus cannot possibly be a framing position. After 11 stages of shift register 34 contain 0's, and only one stage contains a 1, the position associated with this stage must be a framing position as this is the only position in successive gruops of 12 bits in which the binary value has continuously alternated.

When the out of synchronism signal appears on conductor 6 the incoming bits are applied to the input of the 12 bit delay 30. The bits are also applied to conductor 8 which is one input of gate 35. Inverter 31 inverts the bit at the output of delay 30, and thus if a 0 appears at the output, a 1 is applied to conductor 36, one of the inputs of gate 35. Similarly, if a 1 appears at the output of delay 30, a 0 is applied to conductor 36. Gate 35 causes a 1 to be applied to conductor 12 if both of its inputs represent the same binary value, that is, 0's appear on both of conductors 8 and 36, or 1's appear on both of these conductors, provided that conductor 10 is energized by the 1 output of the last stage of shift register 34. In the event that the signals on conductors 8 and 36 represent different binary values, or the last stage of shift register 34 contains a 0, a 0 is applied to conductor 12. Initially all stages of shift register 34 contain 1's, and thus if the first and thirteenth bits received are different (0–1 or 1–0), a 1 is stored in the first stage of shift register 34. If the second and fourteenth bits are also different, the first 1 is stored the first stage of shift register 34 is shifted to the second stage, and another 1 is stored in the first stage. If, for example, the third and fifteenth bits received have the same binary value however, although conductor 10 is energized, a 0 is applied to conductor 12 as different binary values appear on conductors 8 and 36. Consequently the two 1's previously stored successively in the first stage of shift register 34 are shifted to the second and third stages respectively, and a binary 0 is now stored in the first stage.

When the 0 stored in the first stage appears in the last stage of shift register 34, conductor 10 is not energized. Thus even if the same binary value is represented on both of conductors 8 and 36 (due, for example, to a "fortuitous" alternation in the input data, which alternation simulates a framing sequence), a 0 is still stored in the first stage of shift register 34. This process continues until eventually 11 of the 12 shift register stages contain 0's, and only on stage will contains the initial 1 stored in the register.

Counter 32 is similar to counter 15 but need only be an 11-count counter rather than a 23-count counter. Synchronization is determined when counter 32 counts 11 0's successively stored in the first stage of shift register 34. At this time conductor 16 is energized and gate 37 is enabled. The next bit stored in the first stage of the shifter register is a 1, and is transmitted along conductor 14 to one input of gate 37. It is also transmitted through delay 18 to reset counter 32.

Although gate 37 is similar to gate 17 in FIG. 2 it has an additional input. The last incoming bit causes a 1 to be stored in the first stage of shift register 34, following the storage therein of eleven 0's in succession. The last incoming bit however, may be either a 0 or a 1 as gate 35 stores a 1 in the first stage of shift register 34 if conductor 10 is energized, and a 0 or a 1 appears on both of conductors 8 and 36. The receiver operates on a complete word which begins with the 1 framing bit rather than the 0 framing bit. As a result it may be desired that conductor 19 be energized only if the last incoming bit was a 1. Although conductor 16 is energized and a 1 appears on conductor 14, gate 37 is operated only if the incoming bit, applied directly to conductor 33, the other input of gate 37, is a 1. If this bit is a 1, conductor 19 is energized. Shift register 34 is reset and all 12 stages contain 1's in preparation for the next synchronization cycle when needed. At the same time the 1 on conductor 19 is applied to conductors 5 and 28, and restores switch 24 to its normal position as shown.

If the last incoming bit was a 0, gate 37 does not energize conductor 19. The 1 on conductor 14 is transmitted through delay 18 and resets counter 32. The synchronizing circuit continues to function, and as 11 stages in shift register 34 contain 0's, eleven 0's are stored in succession in the first stage of shift register 34. The next incoming bit, this time a 1, causes a 1 to be stored in the first stage of shift register 34. Once again conductors 16 and 14 are energized. This time however, conductor 33 contains a 1 as well, and a 1 is applied by gate 37 to conductor 19.

As stated above, the synchronization technique affords maximum reliability. This is apparent as it is definitely established which positions are the data positions, the remaining position, the only one having contained the correct framing sequence, necessarily being the framing position. Unlike prior art techniques an erroneous determination of synchronization is precluded as the random nature of the data bits cannot accidentally identify a data position as a framing position. That the technique of the invention also permits synchronization in a minimum amount of time will become apparent from the following analysis in which the circuit of FIG. 2 is considered.

The circuit of FIG. 2 examines successive groups of 24 bits and determines synchronization to have been regained after 23 of these positions have contained at least one binary 0. Consider a particular one of these positions. When the first group of bits is examined the probability that the particular position under consideration contains a binary 0 is ½, because the probability of a random data bit being a 0 is ½. Thus, ½ is the probability that the particular position under consideration is determined not to be a framing position when the first bit in this position is examined.

The probability that the first bit in this position is a 1 is also 1/2. The probability that the second bit in this position is a 0 is also 1/2. Thus the probability that the particular position under consideration will contain a 1–0 sequence after the first two words is $1/2\times1/2$ or 1/4. This 1/4 is the probability that the particular position under consideration is determined to be a data bit not when the first bit was examined, but rather when the second bit is examined.

The probability that the first three bits received in the particular position under consideration are 1–1–0 in succession is $1/2\times1/2\times1/2$ or 1/8. This is the probability that the particular position is determined to be a data position only when the third bit is received.

By a similar analysis it is apparent that the probability that the particular position is determined to be a data position not when the first $x-1$ words are examined but only when the $x$th bit is received is $(1/2)^x$. These probabilities are all mutually exclusive. That is to say, the particular position is determined to be a data position when the first bit is examined, or when the second bit is examined and not before, or when the third bit is examined and not when the first two are received, etc. The total probability that the particular position has been established to be a data position after $x$ bits are examined is merely the sum of the probabilities above. Thus the probability $P_x$ that the particular position is determined to be a data position after $x$ bits in succession in this position have been examined is given by the expression $$P_x=1/2+1/4+1/8+\ . \ . \ . \ +(1/2)^x$$

The sum $S_x$ of this geometric progression may be obtained by first determining the sum of this progression as $x$ approaches infinity, and by subtracting from this sum the sum of the infinite series beginning with the term whose power is $x+1$. The sum of an infinite geometric progression whose first term is $a$ and whose multiplication factor is $r$, where $1>r>0$ is $a/(1-r)$. The sum of the geometric series whose first term is 1/2 and whose multiplication factor is 1/2 is thus $1/2(1-1/2)$ or 1. The sum of the progression whose first term is $(1/2)^{x+1}$ is $(1/2)^{x+1}/(1-1/2)$, or $(1/2)^x$. Thus the sum of the series from 1/2 through $(1/2)^x$ is $1-(1/2)^x$.

This last expression is the probability that the particular position under consideration is determined not to be a framing position after $x$ bits in succession in this position have been examined. This is also the probability that any one of the 23 bit positions is determined not to be a framing position after $x$ bits in the same position have been examined. The probability that each of the 23 bit positions is determined to be a data position after $x$ groups of bits have been examined is thus $[1-(1/2)^x]^{23}$. This term is the probability that after $x$ groups of bits have been examined synchronization is achieved.

After only six groups of bits have been examined the probability that sychronization has been achieved in the circuit of FIG. 2 is $[1-(1/2)^6]^{23}$ or approximately .67. This probability is high and shows that the probability of achieving synchronization after only six groups of bits have been examined in the circuit of FIG. 2 is considerably greater than the generally obtained in the prior art. A similar analysis may be made for the circuit of FIG. 4 and for other applications of the invention. In all of these it becomes apparent that a minimum time is required for the synchronization process.

It should be noted that the circuits of FIG. 2 and FIG.

4 each operates upon respective positions in successive groups of incoming bits. Both circuits establish that all positions except one in each group are definitely not the framing position. In the embodiment of FIG. 2 this is accomplished by verifying that each position in at least one group of incoming bits contained a bit of binary value 0. In the embodiment of FIG. 4 this is accomplished by determining that respective positions in successive groups of incoming bits contain the same binary value. The difference is based upon the fact that successive framing bits in the word of FIG. 1 have the same binary value, while successive framing bits in the word of FIG. 3 have different binary values. The method may be extended, and by employing the principles of the invention a synchronizing circuit may be designed to operate in conjunction with other types of incoming words, where successive framing bits have the same value, different values, or combinations of these.

In both illustrative embodiments a counter is employed to count successive 0's stored in the shift registers. The function of each counter may be broadly stated to be that of examining the relative positions of those bit positions determined to contain data bits, or conversely the relative positions of those bit positions for which it has not yet been determined that they do not contain framing bits. Synchronization is obtained when the examination discloses a pattern of known framing or data positions that conforms to only one identical recurring pattern in the incoming bit stream.

The invention is not limited to binary schemes. If the data transmitted may have three or more distinct values, the method of the invention is still applicable for determining which positions contain framing bits. Also, it should be noted that while the circuit of FIG. 2 is applicable to asychronous as well as synchronous communication systems as the circuit is operative with a variable time interval between received bits, the circuit of FIG. 4 is operative only with a synchronous system. This is due to the fact that delay 30 is a time dependent element, and an incoming bit must be received just when the bit 12 positions behind appears at the input of inverter 31. FIG. 4 is easily adaptable however to a synchronous systems. A 12-bit shift register may be substituted for delay 30. In such an event gate 35 must be inhibited until after the first 12 bits have been received. If this were not done, the first 12 bits received would be applied to gate 35 with whatever was left stored in the shift register after the operation of the synchronizing circuit the previous time synchronism was lost. Other alternatives will be apparent to those skilled in the art for making the circuit of FIG. 4 compatible with a synchronous communication systems.

It is to be understood that the above-described embodiments are only illustrative of the application of the principles of the invention, and that various modifications may be made therein without departing from the spirit and scope of the invention.

What is claimed is:

1. A circuit for synchronizing a stream of transmitted words each of which has a length of $x$ bits of which one bit is a framing bit of constant value and $x-1$ bits are random data bits, said circuit comprising a shift register each stage of which initially contains a bit of the same value as said framing bit; gating means having a control terminal connected to the last stage of said shift register; means for applying incoming bits to said gating means; said gating means being connected to the first stage of said shift register to store in said first stage a bit of the value of said framing bit whenever the bit stored in said last stage and an incoming bit both have the same value as said framing bit and to store in said first stage a bit having the opposite value of said framing bit whenever either the bit stored in said last stage or an incoming bit has a binary value opposite to that of said framing bit; counting means connected to said first stage for counting successive bits stored in said first stage having said opposite binary value; resetting means responsive to the operation of said first stage for resetting said counting means whenever a bit stored in said first stage has the value of said framing bit; and output means connected to said counting means and said first stage for indicating synchronization after said counting means has counted the successive storing in said first stage of $x-1$ bits of said opposite value followed by the storing in said first stage of a bit having the same value as said framing bit.

2. A synchronizing circuit in accordance with claim 1 further including means connected to said shift register and responsive to the operation of said output means for storing a bit of the same value as said framing bit in each stage of said shift register.

3. A synchronizing circuit in accordance with claim 2 further including means for delaying the resetting of said counting means for an interval after the storage in said first stage of a bit having the same value as said framing bit, said interval being long enough to insure operation of said output means by said counting means having counted $x-1$ successive bits of said opposite value.

4. A synchronizing circuit for use with a bit stream wherein each word of $x$ bits is divided into first and second groups, said first group containing a framing bit of a first constant binary value and $$\frac{x}{2}-1$$

data bits of random binary values, said second group containing a framing bit of the second constant binary value separated from said framing bit in said first group by $x/2$ bit positions and $$\frac{x}{2}-1$$

random data bits of random binary values, said circuit comprising shift register means containing $x/2$ stages each initially containing a bit of said first binary value; gating means having a control terminal connected to the last stage of said shift register means; first and second input terminals connected to said gating means; means for applying incoming bits directly to said first terminal; means for applying to said second terminal a bit having a binary value opposite to the binary value of the bit received $x/2$ bit positions before said bit being applied to said first terminal; means connecting said gating means to the first stage of said shift register means for storing in said first stage a bit of said first binary value whenever said last stage contains a bit of said first binary value and the bits applied to said first and second terminals have the same binary value, and for storing in said first stage a bit of said second binary value whenever said last stage contains a bit having said second binary value or said bits being applied to said first and second input terminals are of different binary values; counting means connected to said first stage for counting the number of successive bits having said second binary value stored in said first stage; resetting means responsive to the operation of said first stage for resetting said counting means whenever a bit of said first binary value is stored in said first stage; and output means for indicating synchronization after said counting means has counted $$\frac{x}{2}-1$$

successive bits of said secondary binary value having been stored in said first stage followed by the storage in said first stage of a bit having said first binary value if the last bit received has said first binary value.

5. A synchronizing circuit in accordance with claim 4 further including means connected to said shift register means responsive to the operation of said output means for storing a bit of said first binary value in each stage of said shift register means.

6. A synchronizing circuit in accordance with claim 5 further including means for delaying the resetting of said counting means after the storage in said first stage of a bit having said first binary value until after said output means has operated responsive to the operation of said counting means.

7. A synchronizing circuit for a data pulse receiver where each word received contains data bits of random and framing bits of constant binary values comprising means for comparing successive groups of incoming bits, the length of each of said groups being equal to that of a received word, means for registering those bit positions in said groups of bits for which the binary value is different at least once in two successive groups, and means responsive to said registering means indicating the appearance of different successive binary values in a number of bit positions equal to the number of data bit positions in a received word for identifying the remaining bit positions in said groups of bits as framing bit positions.

8. A synchronizing circuit for a data pulse receiver where each word received contains random data bits and framing bits of alternating binary values comprising means for comparing successive groups of incoming bits, the length of each of said groups being equal to the number of bit positions containing a predetermined number of data bits and a predetermined number of framing bits, means for registering those bit positions in said groups of bits for which the binary values are the same at least once in two successive groups, and means responsive to said registering means indicating the appearance of the same successive binary value in a number of bit positions equal to the number of data bit positions in one of said groups for identifying the remaining bit positions in said groups of bits as framing bit positions.

9. A synchronizing circuit for operating with a stream of bits; said stream of bits containing random data bits and framing bits having a predetermined binary value sequence in predetermined positions, comprising means for comparing successive groups of incoming bits all having the same selected length; means for establishing which bit positions in said successive groups contain binary value sequences inconsistent with said predetermined framing sequence; and counting means responsive to said establishing means having established said inconsistency for a number of bit positions in said length that is equal to the number of random data bit positions contained in said length for identifying the remaining bit positions in said length as framing bit positions.

10. A synchronizing circuit for operating with a stream of data, said stream of data containing random data and framing data in predetermined positions and having a predetermined sequence, comprising means for comparing successive groups of incoming data all having the same selected length, means for establishing which data positions in said successive groups contain sequences inconsistent with said predetermined framing data sequence, and means responsive to said establishing means having established said inconsistency for a number of data positions in said length that is equal to the number of random data positions contained in said length for identifying the remaining data positions in said length as framing data positions.

11. A synchronizing circuit for operating with a series of interspersed bits of two types, said two types being data bits and framing bits, said framing bits appearing in predetermined positions and having a predetermined sequence of values, comprising means for comparing to each other the values of bits in bit positions separated from each other by a number of bit positions such that said bits in said separated bit positions are all of the same type, means responsive to said comparing means for registering which of said separated bit positions contain a sequence of bits of values consistent with one of said two types of bit information, means responsive to said registering means for establishing the numbers of successive registered bit positions, and means responsive to said establishing means for indicating synchronization when a number of said successive registered bit positions is equal to the number of bit positions in only one group of successive bit positions in said series of bits that could contain only said one type of bit information.

12. A synchronizing circuit for operating with a data stream in which each word comprises a series of interspersed bits of two types, said two types being data bits and framing bits, said framing bits appearing in predetermined positions and having a predetermined sequence of values, comprising means for comparing to each other the values of bits in bit positions separated from each other by a number of bit positions such that said bits in said separated positions are all of the same type, means responsive to said comparing means for registering which of said separated bit positions contain a sequence of bits of values consistent with the same type of said two types of bit information, and means responsive to said registering means for indicating synchronization when the sequence of types of bit information registered for said bit positions are consistent with a sequence of bit types contained in only one sequence of bit positions in a word.

13. A synchronizing circuit for operating with a stream of bits containing random data and framing bits in predetermined positions, said framing bits having a predetermined sequence of values, comprising shift register means for comparing successive groups of incoming bits all having the same selected length and for establishing which respective bit positions in said successive groups contain sequences of values inconsistent with said predetermined framing sequence, counting means connected to said shift register means for counting the number of successive bits stored in said shift register means, output means connected to said counting means for indicating synchronization after said counting means has counted a number of said successive stored bits to a total determinative of the framing bit positions, and resetting means for resetting said counting means responsive to the storage in said shift register means of a bit having a value inconsistent with said predetermined framing sequence.

14. A synchronizing circuit in accordance with claim 13 wherein said output means is responsive to said counting means counting to a total equal to the number of random data bits in said stream between successive framing bits.

15. The method of establishing which bits in a bit stream are data bits and which are framing bits, where the framing bits appear in predetermined positions and have a predetermined sequence of values, comprising the steps of (1) comparing to one another the values of bits in respective bit positions in successive equal length groups of bits, (2) registering which respective positions in said groups of bits have a sequence of bit values inconsistent with said predetermined framing sequence as ascertained by repetitions of the comparing step, and (3) counting the number of successive bit positions in the bit stream wherein the sequence of bit values has been ascertained as inconsistent with the predetermined framing sequence, whereby the framing bit positions are established when the number of successive bit positions counted is equal to the total number between the framing bit positions.

16. The method of establishing which bits in a bit stream are data bits and which are framing bits, where the framing bits appear in predetermined positions and have a predetermined sequence of values, comprising the steps of (1) comparing to one another the values of bits in respective bit positions separated by a predetermined number of bit positions, (2) registering those bit positions having contained compared bits of values inconsistent with the predetermined framing sequence as ascertained by repetitions of the comparing step, and (3) identifying the remaining unrecorded bit positions as framing bit positions when all possible data bit positions in the bit stream have been registered as containing compared bit values inconsistent with the predetermined framing sequence.

References Cited

UNITED STATES PATENTS

| | | | |
|---|---|---|---|
| 2,979,565 | 4/1961 | Zarcone | 178—50 |
| 3,185,824 | 5/1965 | Blasbalg et al. | 235—154 |
| 3,185,823 | 5/1965 | Ellersick et al. | 235—154 |
| 3,213,268 | 10/1965 | Ellersick | 235—154 |
| 3,223,982 | 12/1965 | Sacerdoti et al. | 340—172.5 |
| 3,229,256 | 1/1966 | Van Bloois et al. | 340—172.5 |

PAUL J. HENON, Primary Examiner

R. F. CHAPURAN, Assistant Examiner

U.S. Cl. X.R.

178—50